US008988619B2

(12) United States Patent
Oka et al.

(10) Patent No.: US 8,988,619 B2
(45) Date of Patent: Mar. 24, 2015

(54) DISPLAY DEVICE WITH DISPLAY PANEL FORMING IMAGE DISPLAY AND LCD PANEL HAVING STRIP-SHAPED ELECTRODES AND LIGHT SHIELDING PORTION

(71) Applicants: Japan Display Inc., Tokyo (JP); Miyuki Sugita

(72) Inventors: Shinichiro Oka, Hitachi (JP); Tatsuya Sugita, Takahagi (JP); Shinichi Komura, Mobara (JP); Toshio Miyazawa, Chiba (JP); Terunori Saitou, Mobara (JP)

(73) Assignee: Japan Display Inc., Tokyo (JP)

( * ) Notice: Subject to any disclaimer, the term of this patent is extended or adjusted under 35 U.S.C. 154(b) by 25 days.

(21) Appl. No.: 14/197,881

(22) Filed: Mar. 5, 2014

(65) Prior Publication Data

US 2014/0192283 A1    Jul. 10, 2014

Related U.S. Application Data

(62) Division of application No. 13/292,233, filed on Nov. 9, 2011, now abandoned.

(30) Foreign Application Priority Data

Nov. 15, 2010    (JP) .................................. 2010-254918

(51) Int. Cl.
*G02F 1/1335*    (2006.01)
*G02F 1/1333*    (2006.01)
(Continued)

(52) U.S. Cl.
CPC ........ *G02B 27/2214* (2013.01); *H04N 13/0409* (2013.01)
USPC .............................. 349/15; 349/110; 349/200

(58) Field of Classification Search
CPC ............. H04N 13/0404; H04N 13/042; G02B 27/2214
USPC ............................................ 349/15, 110, 200
See application file for complete search history.

(56) References Cited

U.S. PATENT DOCUMENTS

2004/0222945 A1    11/2004   Taira et al.
2005/0248705 A1    11/2005   Smith et al.
(Continued)

FOREIGN PATENT DOCUMENTS

CN    101339345    1/2009
JP    2004-258631   9/2004
(Continued)

OTHER PUBLICATIONS

Partial English translation of Office Action issued in corresponding Chinese Patent Application No. 201110368955.9, dated Mar. 3, 2014.

*Primary Examiner* — Mark Robinson
*Assistant Examiner* — Robert Tavlykaev
(74) *Attorney, Agent, or Firm* — Antonelli, Terry, Stout & Kraus, LLP.

(57) ABSTRACT

There is provided a technology capable of reducing crosstalk at the time of 3D display in a display device using a liquid crystal lens that forms cylindrical lenses by controlling a voltage applied to a liquid crystal panel. The display device includes a liquid crystal display panel which includes a substrate including a plurality of strip-shaped transparent electrodes and a plurality of strip-shaped light shielding portions overlapping with the electrodes. The display device displays an image by switching a two-dimensional display and a three-dimensional display, and the cylindrical lenses making up a parallax barrier, are formed by controlling a refraction index of a liquid crystal layer.

2 Claims, 12 Drawing Sheets

(51) Int. Cl.
*G02F 1/13* (2006.01)
*G02B 27/22* (2006.01)
*H04N 13/04* (2006.01)

(56) References Cited

U.S. PATENT DOCUMENTS

| | | | |
|---|---|---|---|
| 2006/0038955 A1* | 2/2006 | Kim et al. | 349/158 |
| 2008/0266387 A1 | 10/2008 | Krijn et al. | |
| 2009/0015738 A1 | 1/2009 | Hong et al. | |
| 2009/0015739 A1 | 1/2009 | Shin et al. | |
| 2009/0122210 A1 | 5/2009 | Im | |
| 2009/0153754 A1* | 6/2009 | Jung | 349/15 |
| 2009/0225243 A1* | 9/2009 | Kim et al. | 349/15 |
| 2010/0149444 A1* | 6/2010 | Hikmet et al. | 349/15 |
| 2011/0084963 A1* | 4/2011 | Im | 345/419 |

FOREIGN PATENT DOCUMENTS

| | | |
|---|---|---|
| JP | 2009-104137 | 5/2009 |
| JP | 2009-520231 | 5/2009 |
| KR | 10-2009-0003023 | 1/2009 |

* cited by examiner

DISPLAY DEVICE WITH DISPLAY PANEL FORMING IMAGE DISPLAY AND LCD PANEL HAVING STRIP-SHAPED ELECTRODES AND LIGHT SHIELDING PORTION

CROSS-REFERENCE TO RELATED APPLICATION

This application is a divisional application of U.S. application Ser. No. 13/292,233, filed Nov. 9, 2011, the contents of which are incorporated herein by reference.

The present application claims priority from Japanese application JP 2010-254918 filed on Nov. 15, 2010, the content of which is hereby incorporated by reference into this application.

BACKGROUND OF THE INVENTION

1. Field of the Invention

The present invention relates to a display device, and more particularly, to a liquid crystal lens type three-dimensional display device including a display panel with a lens function at a display surface side.

2. Description of the Related Art

In a display device in the related art, there is disclosed a display device that is capable of switching between a two-dimensional (2D) display and a three-dimensional (3D) display for the naked eye without the use of eyeglasses or the like. The display device is, for example, a liquid crystal device including a first liquid crystal display panel that performs an image display, and a second liquid crystal display panel that is disposed at a display surface side (observer side) of the first liquid crystal display panel and forms a parallax barrier that allows different light beams to be incident to observer's left and right eyes during a 3D display. The display device changes a refraction index in the second liquid crystal display panel by controlling an orientation of liquid crystal molecules of the second liquid crystal display panel, forms lens (lenticular lens, cylindrical lens array) regions that extend in the vertical direction of the display surface and are arranged in parallel in the horizontal direction, and directs light of a pixel corresponding to the left and right eyes to a visual point of the observer. The display device is called a liquid crystal lens type three-dimensional display device.

As the liquid crystal lens type three-dimensional display device, for example, an autostereoscopic display device disclosed in JP 2009-520231 A may be exemplified. In the display device disclosed in JP 2009-520231 A, a planar electrode is formed on one side of a transparent substrate, strip-shaped electrodes (linear electrodes), which extend in a direction where lenses are formed, are formed on an opposite side of another transparent substrate where the two transparent substrates are disposed to be opposite to each other with a liquid crystal layer interposed therebetween, and the linear electrodes are arranged in parallel in a direction where the lenses are arranged. In this configuration, the refraction index of the liquid crystal molecules is controlled by controlling a voltage applied to the strip-shaped electrodes and a voltage applied to the planar electrode, and thereby a configuration enabling switching control of the 2D display and the 3D display is realized.

SUMMARY OF THE INVENTION

However, in the display device disclosed in JP 2009-520231 A, in regard to a 3D display, there is a concern that so-called crosstalk in which a parallax image to be displayed only on a predetermined eye is visible to the other eye may occur. When this crosstalk occurs, an image for the other eye, which ought not to be visible, is displayed in an overlapping manner. Therefore, a quality of the 3D display largely decreases, so that it is desirable to decrease the crosstalk.

The invention has been made in consideration of the above-described problems, and an object of the invention is to provide a technology capable of reducing crosstalk at the time of a 3D display in a display device using a liquid crystal lens that forms a cylindrical lens by controlling a voltage applied to a liquid crystal panel.

(Case 1) According to an aspect of the invention, there is provided a display device displaying an image by switching a two-dimensional display and a three-dimensional display. The display device includes a display panel performing an image display, and a liquid crystal display panel being disposed at a display surface side of the display panel. The liquid crystal display panel includes a first transparent substrate including a planar transparent electrode, a second transparent substrate being opposite to the first substrate, and a liquid crystal layer being interposed between the first substrate and the second substrate. The second transparent substrate includes a plurality of strip-shaped electrodes being formed of a transparent electrode material, extending in a first direction, and being arranged in parallel in a second direction intersecting with the first direction, and a plurality of strip-shaped light shielding portions overlapping with the plurality of strip-shaped electrodes and extending in the first direction. In the display device, cylindrical lenses extending in the first direction, being arranged in parallel in the second direction, and making up a parallax barrier, are formed by controlling a refraction index of the liquid crystal layer.

(Case 2) According to another aspect of the invention, there is provided a display device displaying an image by switching a two-dimensional display and a three-dimensional display. The display device includes a display panel performing an image display, and a liquid crystal display panel being disposed at a display surface side of the display panel. The liquid crystal display panel includes a first transparent substrate including a planar transparent electrode, a second transparent substrate being opposite to the first substrate, and a liquid crystal layer being interposed between the first substrate and the second substrate. The second transparent substrate includes a plurality of strip-shaped electrodes being formed of a metallic material having a light shielding property, extending in a first direction, and being arranged in parallel in a second direction intersecting with the first direction. In the display device, cylindrical lenses extending in the first direction, being arranged in parallel in the second direction, and making up a parallax barrier, are formed by controlling a refraction index of the liquid crystal layer.

According to the invention, in regard to a display device using a liquid crystal lens that forms a cylindrical lens by controlling a voltage applied to a liquid crystal panel, it is possible to reduce crosstalk at the time of a 3D display, and thereby it is possible to improve a display image quality.

Other effects of the invention will be apparent from the description of the entire specification.

DETAILED DESCRIPTION OF THE INVENTION

Figure 1:
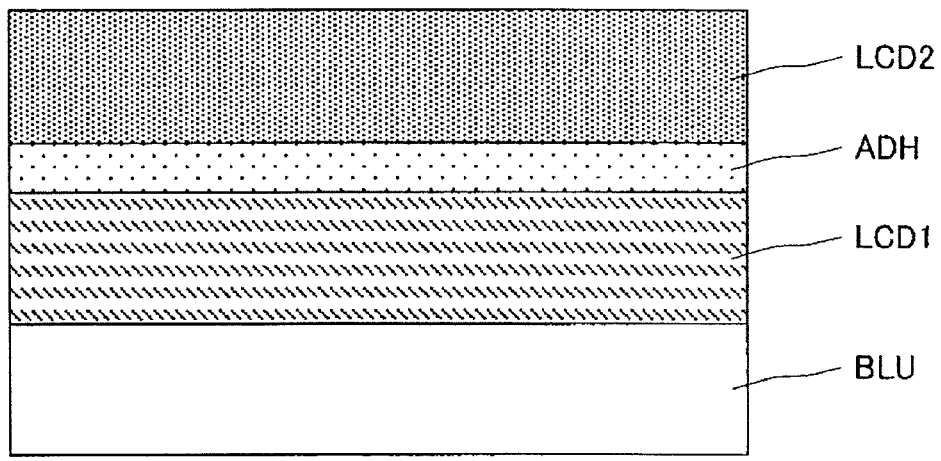
FIG. 1 is a cross-sectional view illustrating the entire configuration of a display device of a first embodiment of the invention.

Hereinafter, embodiments of the invention will be described with reference the accompanying drawings. Note that in the following description, like reference numerals will be given to like parts having the substantially same functions, and description thereof will not be repeated.

First Embodiment

Entire Configuration

FIG. 1 shows a cross-sectional view illustrating the entire configuration of a display device (liquid crystal display device) of a first embodiment of the invention. Hereinafter, the entire configuration of the display device of the first embodiment will be described based on FIG. 1. Note that in the following description, the description will be given with respect to a case where, as a display panel performing an image display, a first liquid crystal display panel LCD1 of a non-luminescent type and a backlight device are used. That is, the display panel includes the liquid crystal display panel and the backlight device. Note that the display panel performing an image display is not limited thereto, but another non-luminescent display panel, a self-luminescent display panel such as an organic EL display panel, or the like may be used.

The liquid crystal display device of the first embodiment includes a first liquid crystal display panel LCD1 that is a liquid crystal display panel for an image display, and a second liquid crystal display panel LCD2 that functions as a lens (a lenticular lens, a cylindrical lens array) by controlling a refraction index of transmitted light. In the liquid crystal display device of the first embodiment, as shown in FIG. 1, the first liquid crystal display panel LCD1 and the second liquid crystal display panel LCD2 are sequentially disposed from a backlight unit (backlight device) BLU. That is, the second liquid crystal display panel LCD2 is disposed at a display surface side (observer side) of the first liquid crystal display panel LCD1. At this time, to prevent a positional alignment between the first liquid crystal display panel LCD1 and the second liquid crystal display panel LCD2 from being deviated, the first liquid crystal display panel LCD1 and the second liquid crystal display panel LCD2 are fixed by an adhesive member ADH. In addition, the adhesive member ADH is formed of a known resin member or the like, but it is preferable that the adhesive member ADH be formed of a member having substantially the same refraction index of a transparent substrate (for example, a glass substrate) that is used as first substrates SUB11 and SUB21, and second substrates SUB12 and SUB22.

The second liquid crystal display panel LCD2 of the first embodiment is formed of a twisted nematic type (hereinafter, referred to as a TN type) liquid crystal display panel, for example. In a case where a voltage is not applied to a plurality of electrodes (strip-shaped electrodes) of the second liquid crystal display panel LCD2, respectively, the display device transmits emission light (display image) from the first liquid crystal display panel LCD1 as it is and thereby performs a 2D display. In contrast, in a case where a voltage is applied to the plurality of electrodes of the second liquid crystal display panel LCD2, respectively, the second liquid crystal display panel LCD2 acts as a lens that becomes a parallax barrier. The parallax barrier gives a binocular parallax that allows the emission light (display image) from the first liquid crystal display panel LCD1 to be individually incident to observer's left and right eyes. Therefore, the display device performs a 3D display. In this manner, the second liquid crystal display panel LCD2 of the first embodiment is a liquid crystal display panel that transmits the incident light as it is in a state where an electric field is not applied to a liquid crystal, and the details thereof will be described later in detail. In addition, the second liquid crystal display panel LCD2 is not limited to the TN type, but other types may be used.

In addition, the first liquid crystal display panel LCD1 may use any type of liquid crystal display panel selected from a TN type liquid crystal display panel, a VA (Vertical Alignment) type liquid crystal display panel, and an IPS (In-Plane Switching) type liquid crystal display panel. In addition, the first liquid crystal display panel LCD1 is formed of a known liquid crystal display panel, so that the description with respect to an optical sheet such as a diffusion plate, or a polarization plate, or the like will omitted.

[Configuration of First Liquid Crystal Display Panel]

Figure 2:
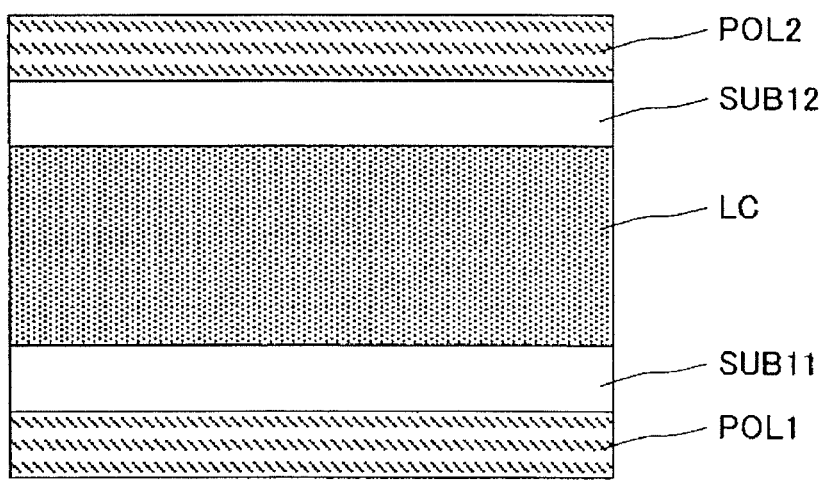
FIG. 2 is a diagram illustrating a schematic configuration of a first liquid crystal display panel in the display device of the first embodiment of the invention.
Figure 3:
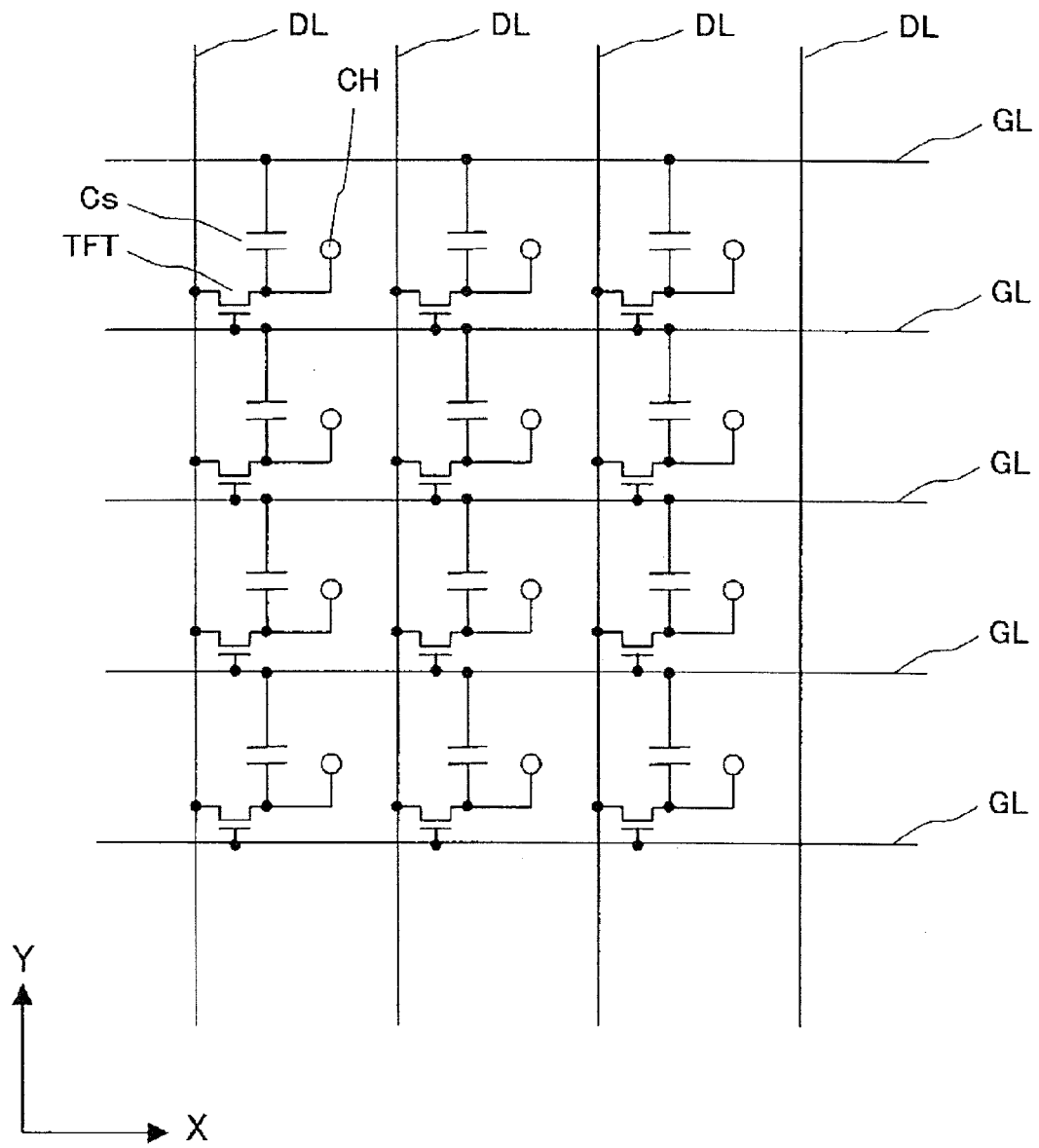
FIG. 3 is a diagram illustrating a configuration of thin film transistors at the side of a first substrate in the first liquid crystal display panel of the first embodiment.
Figure 4:
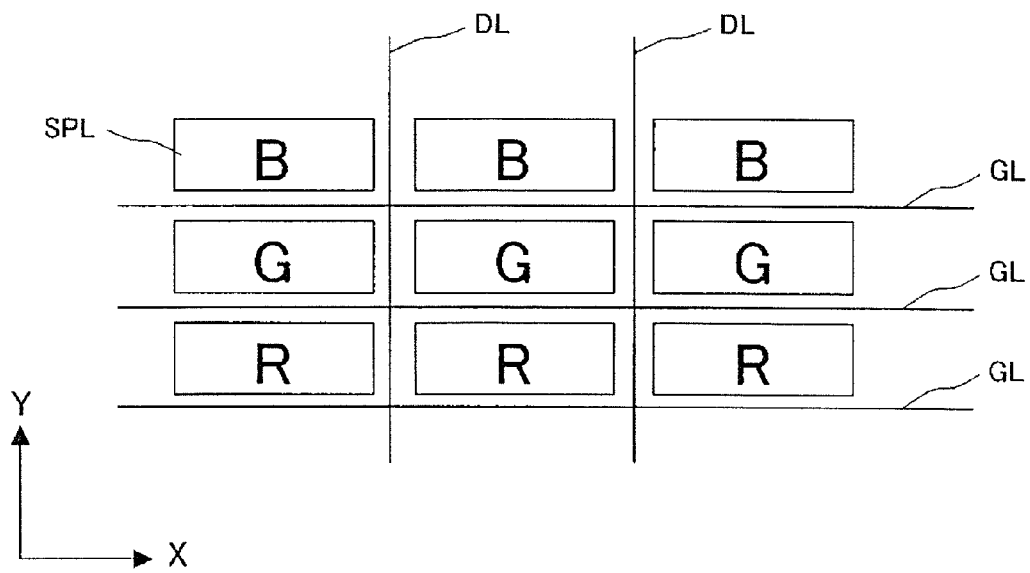
FIG. 4 is a diagram illustrating a configuration of pixels in the first liquid crystal display panel of the first embodiment.

FIG. 2 shows a diagram illustrating a schematic configuration of the first liquid crystal display panel in the display device of the first embodiment of the invention, FIG. 3 shows a diagram illustrating a configuration of thin film transistors at the side of a first substrate in the first liquid crystal display panel of the first embodiment, and FIG. 4 shows a diagram illustrating a configuration of pixels in the first liquid crystal display panel of the first embodiment. In the drawings, X and Y are meant to indicate an X-axis and a Y-axis, respectively.

As shown in FIG. 2, the first liquid crystal display panel LCD1 of the first embodiment is a known liquid crystal display panel, and the first liquid crystal display panel LCD1 of the first embodiment includes a known pair of transparent substrates (the first substrate SUB11 and the second substrate SUB12) such as a glass substrate, and a liquid crystal layer (liquid crystal molecules LC). The pair of transparent substrates is disposed to be opposite to each other, and the liquid crystal layer is interposed between the pair of transparent substrates. Known thin film transistors, pixel electrodes, and the like are formed in the first substrate SUB11, and color filters, known black matrixes, and the like are formed in the second substrate SUB12. At this time, for example, the first substrate SUB11 is formed of a transparent substrate larger than the second substrate SUB12, and a connection terminal for a connection with the outside and the like are formed at a peripheral portion of the first substrate SUB11. In addition, the first substrate SUB11 and the second substrate SUB12 are fixed by a known sealing material applied in a rim shape along the peripheral portion of the second substrate SUB12, and a liquid crystal is sealed between the first substrate SUB11 and the second substrate SUB12. In addition, a first polarization plate POL1 is disposed on the first substrate SUB11 at the backlight device side thereof (on a surface opposite to the liquid crystal side surface), a second polarization plate POL2 is disposed on the second substrate SUB12 at the display surface side thereof (on a surface opposite to the liquid crystal side surface). The first polarization plate POL1 and the second polarization plate POL2 are disposed in such a manner that a polarization direction makes an angle of 90°.

Note that in the first liquid crystal display panel LCD1 of the first embodiment, in a region where the liquid crystal is sealed, pixel regions (hereinafter, referred to as "pixels") each including each sub-pixel of red (R), green (G), and blue (B) for a color display serves as a display region. Therefore, even in the region where the liquid crystal is sealed, a region where the pixel is not formed does not serve as a display region.

In the first liquid crystal display panel LCD1 of the first embodiment, as shown in FIG. 3, within a display region formed in a liquid crystal side surface of the first substrate SUB11, a plurality of gate lines GL, which extend in an X-direction and are arranged in parallel in a Y-direction in the drawing, are formed. In addition, a plurality of drain lines DL, which extend in the Y-direction and are arranged in parallel in the X-direction in the drawing, are formed. Rectangular regions surrounded by the drain lines DL and the gate lines GL corresponds to color filters of red (R), green (G), and blue (B) formed in the second substrate SUB12, and each pixel including three sub-pixels SPL of RGB is disposed in a matrix shape in the display region, as shown in FIG. 4. In addition, in the first embodiment, each sub-pixel SPL of RGB is arranged in parallel in the Y-direction, but it is not limited thereto. Other arrangements such as each sub-pixel SPL of RGB being arranged in parallel in the X-direction are possible.

Each sub-pixel SPL includes a thin film transistor TFT that is turned on by a scanning signal supplied from the gate line GL, a pixel electrode (not shown) to which a gray-scale signal (gray-scale voltage) is supplied, and a parasitic capacitor Cs formed between the pixel electrode and an adjacent gate line GL. In addition, the gray-scale signal applied to the pixel electrode is applied to the drain line DL, and the gray-scale signal is supplied to the pixel electrode through the thin film transistor TFT that is turned on, and a contact hole CH disposed between the thin film transistor TFT and the pixel electrode. In addition, in the case of an IPS type liquid crystal display panel, a common electrode (not shown) to which a common signal having a potential that becomes a reference for the gray-scale signal is supplied is provided to the first substrate SUB11 at the side where the thin film transistors TFT are formed. In addition, in the case of the VA type or TN type liquid crystal display panel, the common electrode is formed at a side of the second substrate SUB12 together with color filters or the like.

[Configuration of Second Liquid Crystal Display Panel]

Figure 5:
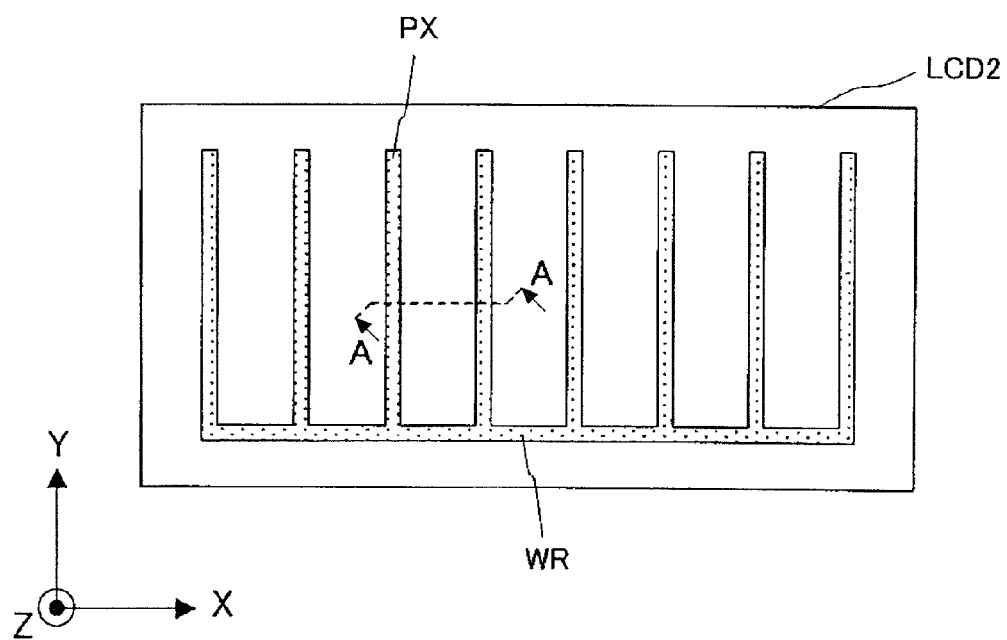
FIG. 5 is a plan view illustrating a detailed configuration of a second liquid crystal display panel in the display device of the invention.
Figure 6:
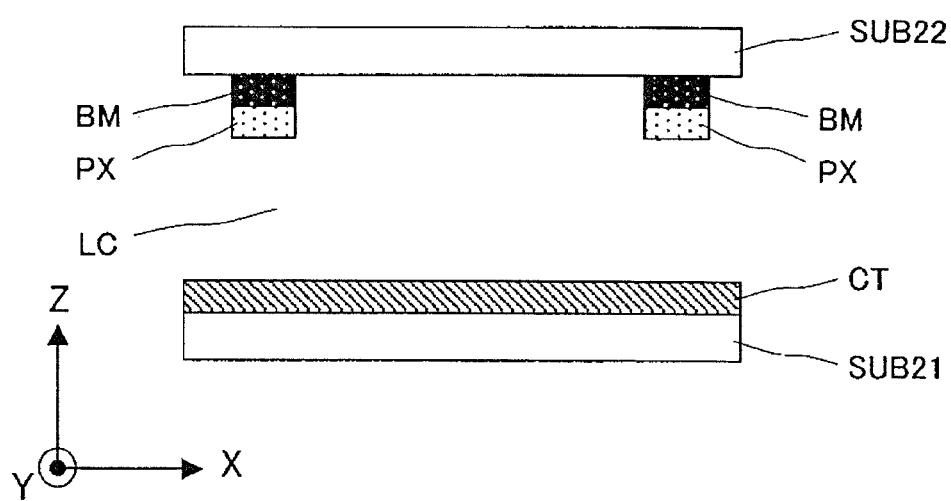
FIG. 6 is a cross-sectional view of the second liquid crystal display panel taken along A-A' line in FIG. 5.

FIG. 5 shows a plan view illustrating a detailed configuration of the second liquid crystal display panel in the display device of the invention, and FIG. 6 shows a cross-sectional view of the second liquid crystal display panel taken along A-A line in FIG. 5. Hereinafter, the second liquid crystal display panel of the first embodiment will be described in detail using FIGS. 5 and 6. In the drawings, X, Y, and Z are meant to indicate an X-axis, a Y-axis, and a Z-axis, respectively.

As shown in FIG. 5, the second liquid crystal display panel LCD2 of the first embodiment includes a plurality of strip-shaped electrodes PX that extend in the Y-direction and are arranged in parallel in the X-direction, and one end of each of the strip-shaped electrodes PX is connected to a wiring line portion WR that extends in the X-direction along one peripheral edge of a long side of the second liquid crystal display panel LCD2. Note that the Y-direction and the X-direction intersect with each other. At this time, the strip-shaped electrodes PX in the second liquid crystal display panel LCD2 are formed of, for example, ITO (Indium Tin Oxide)-based or ZnO (zinc oxide)-based transparent electrode material, but the wiring line portion WR is not limited to the transparent electrode. As will be described later in detail, in the second liquid crystal display panel LCD2 of the first embodiment, cylindrical lenses that extend in the Y-direction between adjacent strip-shaped electrodes PX are arranged in parallel in the X-direction, and thereby a lenticular-shaped cylindrical lens array is formed. That is, a plurality of cylindrical lenses, which extend in the Y-direction and are arranged in parallel in the X-direction, are formed and the plurality of cylindrical lenses serve as a parallax barrier. At this time, in the second liquid crystal display panel LCD2, a region where the cylindrical lens array is formed is a position corresponding to the display region of the first liquid crystal display panel LCD1. As a result, in the liquid crystal display device of the first embodiment, in a case where both eyes of the observer are aligned in the X-direction, it is possible to distribute light beams of different pixels, that is, images at different points of view to both eyes of the observer, respectively, and thereby a stereoscopic vision is realized.

At this time, as shown in the cross-sectional view (cross-sectional view taken along A-A line in FIG. 5) in FIG. 6, the second liquid crystal display panel LCD2 of the first embodiment includes a pair of transparent substrates (a first transparent substrate SUB21 and a second transparent substrate SUB22), and a liquid crystal layer (liquid crystal molecules LC). The pair of transparent substrates is disposed to be opposite to each other, and the liquid crystal layer is interposed between the pair of transparent substrates. At an opposite surface side (liquid crystal surface side) of the second substrate SUB22 that is disposed at an upper side in the drawing, for example, a plurality of light shielding portions BM, which are formed of a resin member such as a known black matrix or the like, extend in the Y-direction, and are arranged in parallel in the X-direction. The light shielding portion BM has a strip shape. At an upper side, that is, at the liquid crystal side of the light shielding portions BM, a plurality of translucent strip-shaped electrodes PX are formed. In addition, a width of the light shielding portion BM of the first embodiment in a direction (X-direction) in which the strip-shaped electrodes PX are arranged in parallel is the same as that of the strip-shaped electrode PX. That is, the width of the strip-shaped electrode PX in the X-direction is the same as that of the light shielding portion BM.

In regard to the second liquid crystal display panel LCD2 of the display device of the first embodiment, among light beams emitted from the first liquid crystal display panel LCD1, a light beam that is incident to the strip-shaped electrode PX is blocked by the light shielding portion BM (light shielding body), and is not emitted from the display surface side (observer side) of the second liquid crystal display panel LCD2.

In addition, as described above, it is preferable that the strip-shaped electrode PX and the light shielding portion BM be disposed close to each other, since parallax does not occur and the transmittance increases. However, it is not limited thereto, but the strip-shaped electrode PX and the light shielding portion BM may be formed in different transparent substrates (first substrate SUB21 and second substrate SUB22). In addition, a forming material of the light shielding portion BM is not limited to the resin material such as the black matrix, but another material having a light shielding property may be used. In addition, a shape of a cross-section of the strip-shaped electrode PX is not limited to a rectangular shape, but may be another shape. For example, the shape may be a trapezoid or an arc shape so that an electric field is generated in an oblique direction.

On the other hand, a planar electrode (counter electrode) CT formed of a transparent conductive film such as ITO and ZnO is formed at the opposite surface side (liquid crystal side surface) of the first substrate SUB21. In this manner, in the second liquid crystal display panel LCD2 of the first embodiment, the strip-shaped electrode PX and the light shielding portion BM are formed to overlap with each other, so that as described later in detail, it is possible to largely reduce an effect caused by crosstalk accompanied with disturbance of a refraction index in a place where the strip-shaped electrode PX is formed, and therefore it is possible to largely improve the image quality at the time of 3D display.

[Detailed Description of Second Liquid Crystal Display Panel]

Figure 7A:
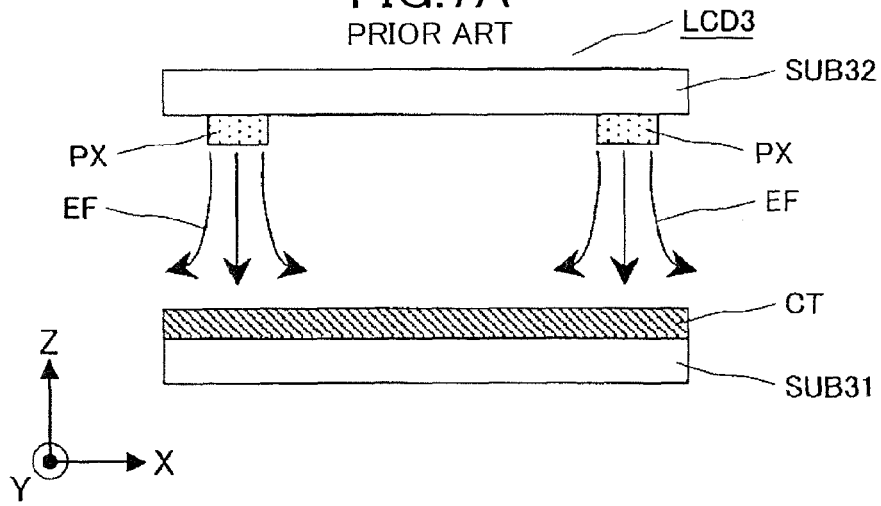
FIGS. 7A to 7C are diagrams illustrating an orientation state of liquid crystal molecules in the second liquid crystal display panel of the related art.
Figure 7B:
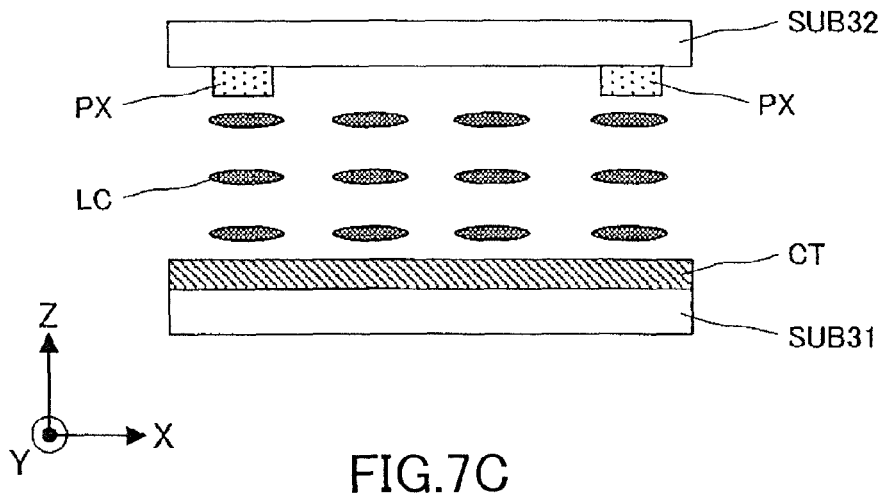
Figure 7C:
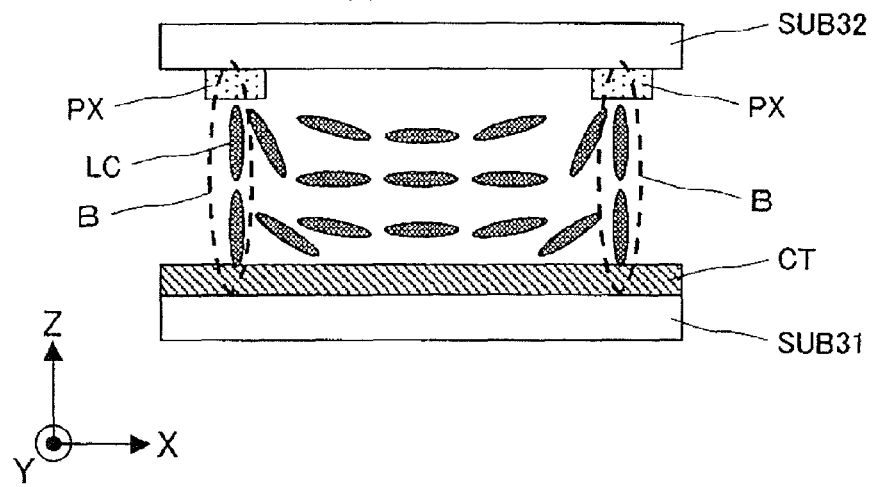
Figure 8:
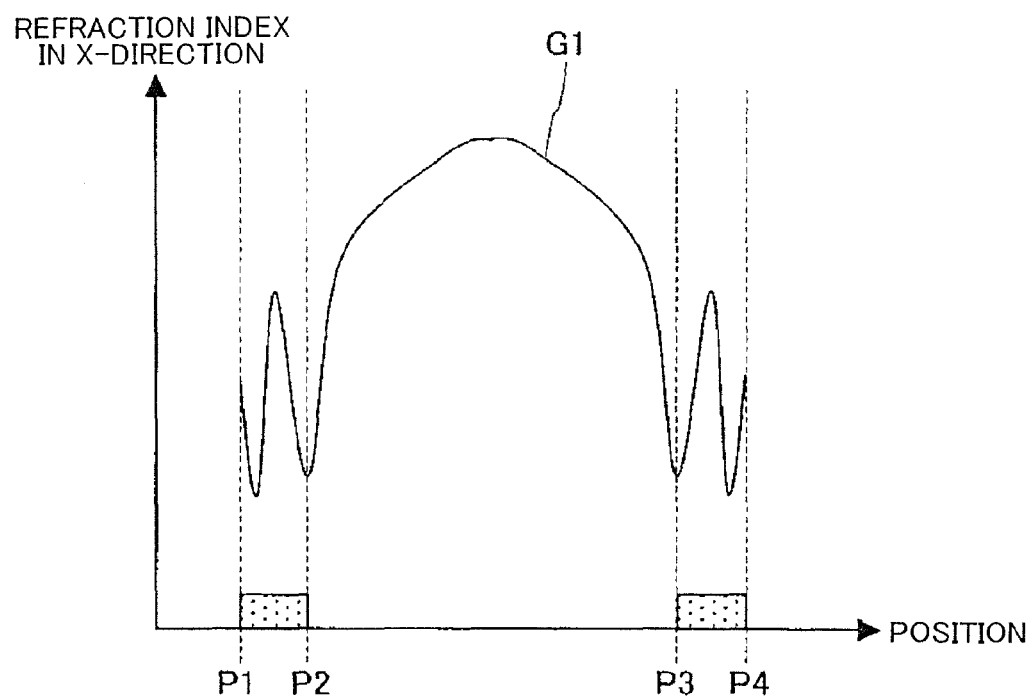
FIG. 8 is a diagram illustrating a relationship between a position with respect to a strip-shaped electrode and a refraction index of a liquid crystal lens in the second liquid crystal display panel of the related art.
Figure 9:
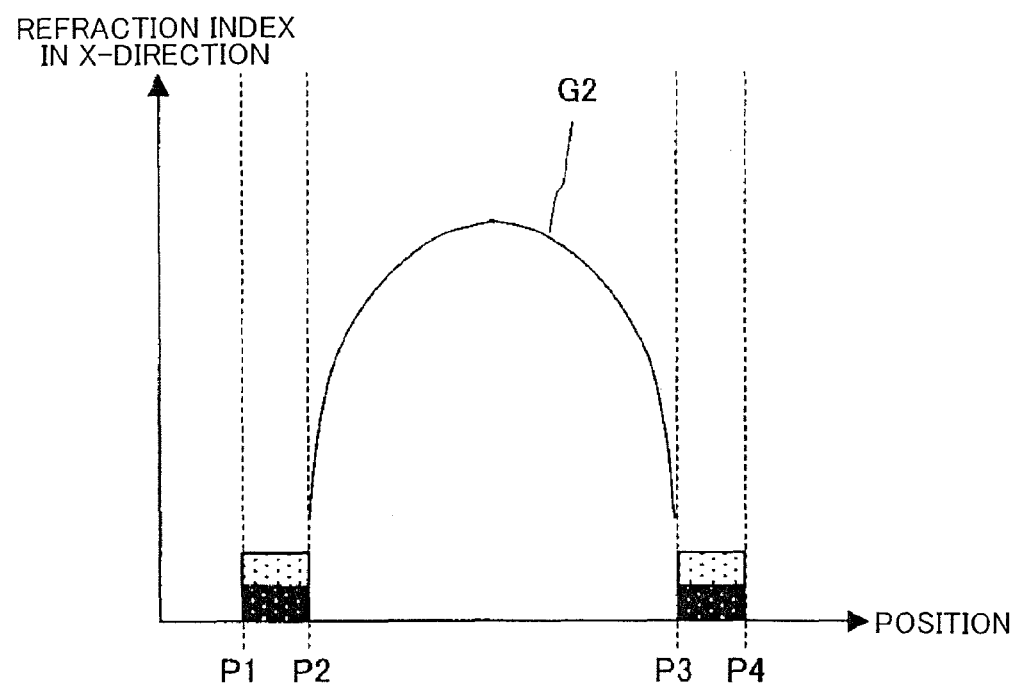
FIG. 9 is a diagram illustrating a relationship between a position with respect to a strip-shaped electrode and a refraction index of a liquid crystal lens in the second liquid crystal display panel of the first embodiment of the invention.
Figure 10:
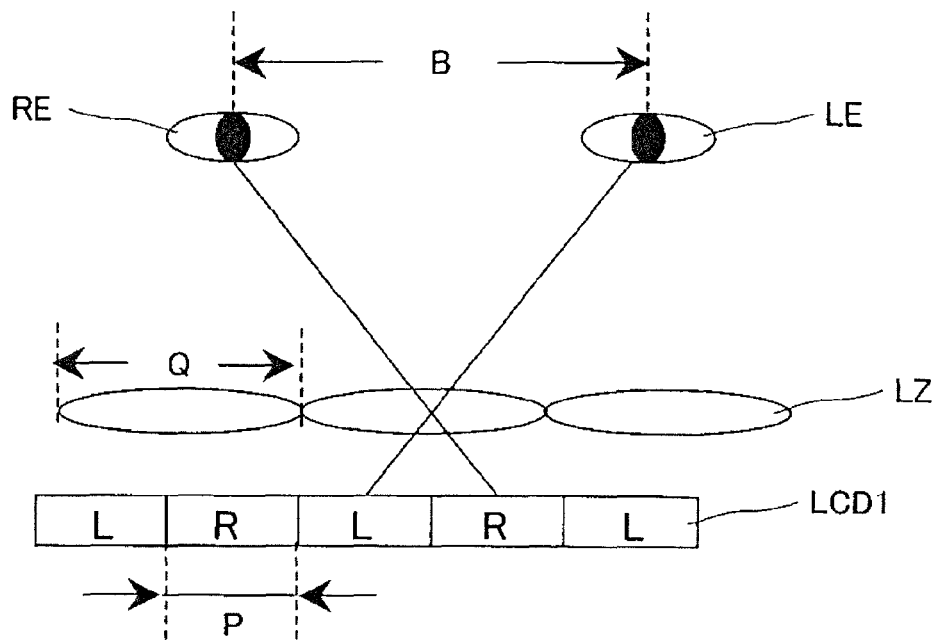
FIG. 10 is a diagram illustrating a relationship between an observer and the first liquid crystal display panel at the time of a 3D display using the liquid crystal lens.

FIGS. 7A to 7C show diagrams illustrating an orientation state of liquid crystal molecules in the second liquid crystal display panel of the related art, FIG. 8 shows a diagram illustrating a relationship (graph G1) between a position with respect to a strip-shaped electrode and a refraction index of a liquid crystal lens in the second liquid crystal display panel of the related art, FIG. 9 shows a diagram illustrating a relationship (graph G2) between a position with respect to a strip-shaped electrode and a refraction index of a liquid crystal lens in the second liquid crystal display panel of the first embodiment of the invention, and FIG. 10 shows a diagram illustrating a relationship between an observer and the first liquid crystal display panel at the time of a 3D display using the liquid crystal lens. Hereinafter, the 3D display by the liquid crystal display device of the first embodiment will be described using FIGS. 7A to 10. In addition, FIG. 7A shows a diagram illustrating a state of an electric field at a portion where the liquid crystal lens is formed at the time of a 3D display in which an electric field is applied between the strip-shaped electrodes and the counter electrode, FIG. 7B shows a diagram illustrating a state of liquid crystal molecules at the portion where the liquid crystal lens is formed at the time of a 2D display in which an electric field is not applied between the strip-shaped electrodes and the counter electrode, and FIG. 7C shows a diagram illustrating a state of the liquid crystal molecules at the portion where the liquid crystal lens is formed at the time of the 3D display in which an electric field is applied between the strip-shaped electrodes and the counter electrode.

As shown in FIG. 7A, in regard to a second liquid crystal display panel LCD3 in the related art, a strip-shaped electrode PX formed of a transparent conductive material is formed at the opposite surface side of a second substrate SUB32 (disposed at an observer side between a pair of substrates). In addition, a planar counter electrode CT that is formed of a transparent conductive material is disposed at the opposite surface side of a first substrate SUB31 that is disposed to be opposite to the second substrate SUB32 with a liquid crystal layer (liquid crystal molecules LC) interposed therebetween. In regard to the liquid crystal display device that uses the second liquid crystal display panel LCD3 in the related art, which is configured in this manner, in the case of performing a 2D display, an image corresponding to a 2D display, that is, the same image as that in the 2D display in the related art is displayed on the first liquid crystal display panel LCD1. At this time, in the second liquid crystal display panel LCD3 (disposed at an observer side of the first liquid crystal display panel LCD1), the same voltage is applied to the strip-shaped electrodes PX and the counter electrode CT, and therefore an electric field is not generated therebetween. As a result, as shown in FIG. 7B, the liquid crystal molecules LC maintains an initial orientation state, and display light from all of the pixels of the first liquid crystal display panel LCD1 reaches the observer's left and right eyes, and therefore an image of a 2D display is recognized.

On the other hand, in the case of performing a 3D display, in the second liquid crystal display panel LCD3 in the related art, as shown in FIG. 7A, when an electric field EF indicated by an arrow is applied between the strip-shaped electrodes PX and the counter electrode CT, a plurality of cylindrical lenses (that are, a cylindrical lens array), which extend in the Y-direction and are arranged in parallel in the X-direction, are formed between strip-shaped electrodes PX that are adjacently disposed. That is, as shown in FIG. 7C, due to the electric field EF applied between the strip-shaped electrodes PX and the counter electrode CT, the orientation direction of the liquid crystal molecules is controlled, and thereby a refraction index of the liquid crystal is changed (is controlled) between the adjacent strip-shaped electrodes PX. As a result, the cylindrical lenses are formed.

Here, the present inventors have found that as shown in FIG. 7A, it is difficult to control the orientation direction of the liquid crystal molecules LC in a region where the strip-shaped electrode PX is formed, because a direction of the electric field EF becomes perpendicular to the X-direction, and thereby a disclination, which is a disturbance of the liquid crystal orientation, occurs at a region indicated by a dotted line B, and as a result thereof, a distribution of the refraction index is disturbed. As is clear from a graph G1 in FIG. 8, which is a measuring result of the refraction index in the X-direction between the pair of strip-shaped electrodes PX in the second liquid crystal display panel LCD3 in the related art, the cylindrical lens is formed at an interval from P2 to P3 that is an interval between the adjacent strip-shaped electrodes PX. In contrast, at an interval from P1 to P2 and an interval from P3 to P4 where each of the strip-shaped electrodes PX is formed, the refraction index of the cylindrical lens that is a liquid crystal lens is greatly disturbed in these regions, and as a result, it is clear that the crosstalk increases.

The present inventors have found that the main reason for this tendency is due to the orientation disturbance of the liquid crystal molecules, which occurs at a border region between the adjacent lenses (cylindrical lenses), by measuring characteristics of the cylindrical lens array that is formed using the liquid crystal panel. That is, within the strip-shaped electrodes to which an electric field is applied to form respective cylindrical lenses, at an electrode portion formed between the adjacent lenses, the disclination, that is, the disturbance in the orientation disturbance of the liquid crystal molecules occurs in a region between the strip-shaped electrode and the planar electrode, and thereby the distribution of the refraction index does not exactly form lens form due to this orientation disturbance, and as a result, the crosstalk occurs.

Therefore, in the second liquid crystal display panel LCD2 of the first embodiment, as shown in FIG. 6 described above, the light shielding portion BM is formed to overlap with the strip-shaped electrode PX. In regard to the second liquid crystal display panel LCD2 of the first embodiment, a graph G2, which is a measuring result of the refraction index in the X-direction between the pair of strip-shaped electrodes PX, is shown in FIG. 9. As shown in FIG. 9, at an interval from P2 to P3 between the pair of strip-shaped electrodes PX, the cylindrical lens is formed, and at an interval from P1 to P2 and an interval from P3 to P4 where each of the strip-shaped electrodes PX is formed, display light in which the refraction index is disturbed is blocked. As a result, in the cylindrical lens functioning as the parallax barrier that is formed in the second liquid crystal display panel LCD2 of the first embodiment, the crosstalk is reduced. Therefore, it is possible to improve an image quality at the time of a 3D display. At this time, in the liquid crystal display device using the second liquid crystal display panel LCD3 in the related art, crosstalk of 6% occurs, but in the liquid crystal display device of the first embodiment, the crosstalk is reduced by half, that is, to 3%. In addition, it is preferable that the refraction index varies according to a quadratic function of position, but the refraction index may be deviated from the quadratic function as long as a distribution of the refraction index is present in a degree in which the crosstalk does not occur. For example, in the case of two visual points, even when a small variation in the refraction index is present in the vicinity of a lens center, the crosstalk is small in this case.

In addition, in the display device of the first embodiment, when parallax is applied to both eyes of observer, a naked-eye 3D display may be performed. Therefore, for example, as shown in FIG. 10, the strip-shaped electrode PX is formed with a predetermined width such that a right eye image R that is displayed on the first liquid crystal display panel LCD1 is incident to the right eye RE of the observer, and a left eye image L is incident to the left eye LE. Note that an interval of the strip-shaped electrode PX varies depending on a position of a visual point of the observer, so that between an interval B between the left and right eyes, a pixel pitch P of the first liquid crystal display panel LCD1, and a pitch (lens pitch) Q of a lens LZ formed in the second liquid crystal display panel LCD2, a relationship of the following Equation (1) is established.

[Equation 1]

$$Q=2P/(1+P/B) \qquad (1)$$

Therefore, the first liquid crystal display panel LCD1 and the second liquid crystal display panel LCD2 provided to the liquid crystal display device of the first embodiment have the pixel pitch P and the lens pitch Q according to Equation (1) with respect to a visual point set in advance. In addition, the liquid crystal display device of the first embodiment is not limited to the two visual points, but may be applied to another visual point type of two points or more.

Figure 11:
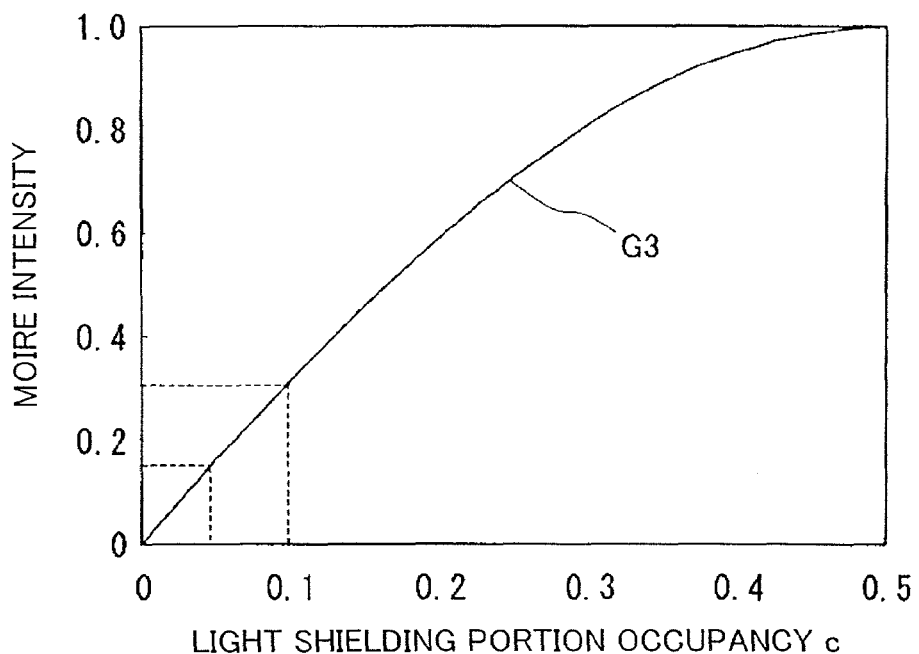
FIG. 11 is a diagram illustrating measuring results of a light shielding portion occupancy and a moire intensity in a liquid crystal display device that is the display device of the invention.
Figure 12:
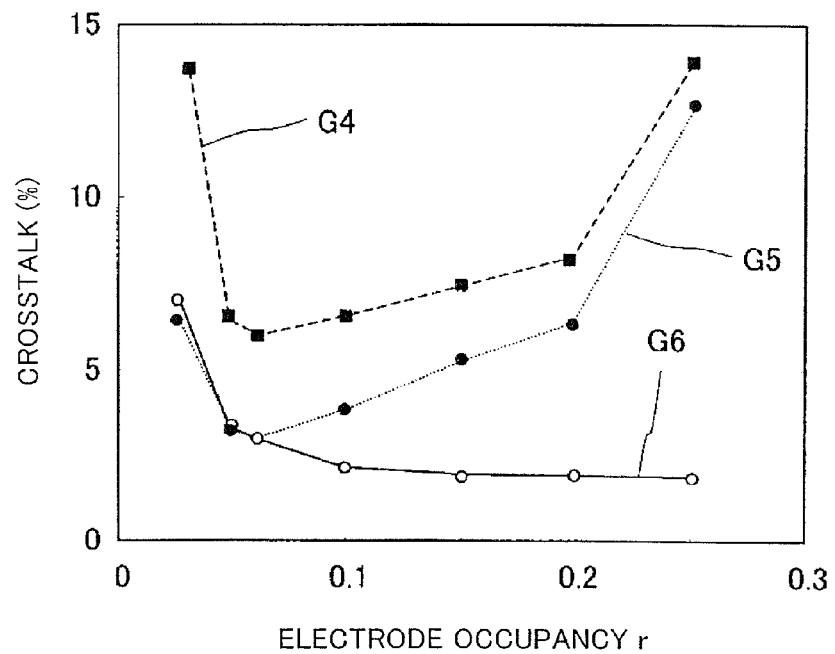
FIG. 12 is a diagram illustrating measuring results of an electrode occupancy and crosstalk in a liquid crystal display device that is a display device of the invention.

FIG. 11 shows a diagram illustrating measuring results (graph G3) of a light shielding portion occupancy and a moire intensity in the liquid crystal display device that is the display device of the invention, and FIG. 12 shows a diagram illustrating measuring results (graphs G4 to G6) of an electrode occupancy and crosstalk in the liquid crystal display device that is a display device of the invention. Here, the moire intensity shown in FIG. 11 indicates that the moire is easily viewed, and a light shielding portion occupancy c is defined by a relationship of $c=S/Q$ from the width S of the light shielding portion BM in the X-direction and the lens pitch Q. In addition, the electrode occupancy r shown in FIG. 12 is defined by a relationship of $r=W/Q$ from the width W of the strip-shaped electrode PX in the X-direction and the lens pitch Q. A graph G4 shown in FIG. 12 indicates a case where the electrode is formed of a transparent electrode only (in a case where the light shielding portion occupancy c is zero), a graph G5 indicates a case where the light shielding portion occupancy c is 0.06, and a graph G6 indicates a case where the width of the electrode and the width of the light shielding portion are the same, respectively.

As is clear from a graph G3 shown in FIG. 11, when the width of the electrode is made to be small, it is difficult for the moire to occur. To reduce the moire to a degree that the moire does not bother an observer, the moire intensity needs to be 0.3 or less, and from the graph G3, it is preferable that the light shielding portion occupancy be 0.1 or less. In addition, to make the moire intensity 0.15 or less that is substantially the same in an ITO electrode having the electrode occupancy of 0.5, which is used in a barrier type 3D, it is preferable that the light shielding portion occupancy be 0.05 or less.

In addition, in the display device of the first embodiment, when the width of the strip-shaped electrode PX and the light shielding portion BM shown in FIG. 6 is the same, to make the crosstalk 3% or less, as shown in a graph G6 of FIG. 12, it is preferable that the electrode occupancy be 0.05 or more.

As described above, in the liquid crystal display device that is a display device of the first embodiment, the second liquid crystal display panel LCD2 is disposed at the display surface side of the first liquid crystal display panel LCD1 that performs an image display, and at the time of a 3D display, the cylindrical lens serving as a parallax barrier is formed in the second liquid crystal display panel LCD2 and a video corresponding to the 3D display is displayed on the first liquid crystal display panel LCD1.

In addition, the plurality of strip-shaped electrodes PX are formed on one transparent substrate of the second liquid crystal display panel LCD2, and the planar counter electrode CT is formed on the other transparent substrate that is disposed to be opposite to the one transparent substrate with the liquid crystal layer interposed therebetween. At the time of the 3D display, an electric field is applied between the plurality of strip-shaped electrodes PX and the counter electrode CT, and thereby a plurality of cylindrical lenses that extend along a direction in which the strip-shaped electrodes PX extend and that are arranged in parallel along a parallel arrangement direction of the strip-shaped electrodes PX are formed. Therefore, at the time of the 3D display, the plurality of cylindrical lenses serve as a parallax barrier. Furthermore, the light shielding portions are formed to overlap with the strip-shaped electrodes PX. Display light that is transmitted through a region where a distribution in the refraction index accompanied with the orientation disturbance of the liquid crystal molecules is disturbed is shielded by the light shielding portion. Therefore, the crosstalk is largely reduced at the time of the 3D display and thereby it is possible to display a 3D display image with a high image quality.

Figure 13A:
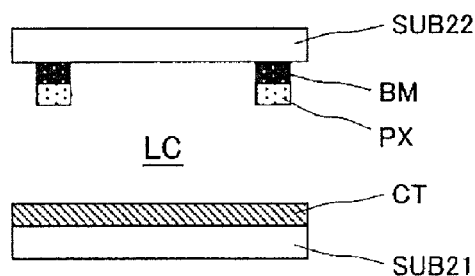
FIGS. 13A to 13D are diagrams illustrating another configuration example of the strip-shaped electrodes, the light shielding portions, and a counter electrode in the second liquid crystal display panel of the first embodiment of the invention.
Figure 13B:
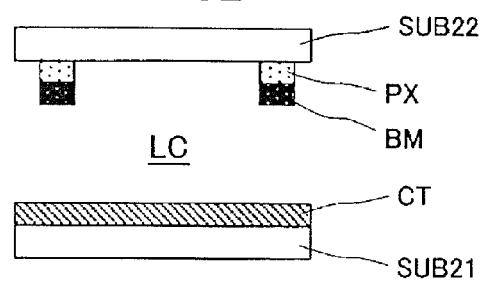
Figure 13C:
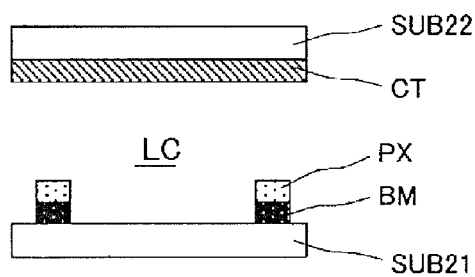
Figure 13D:
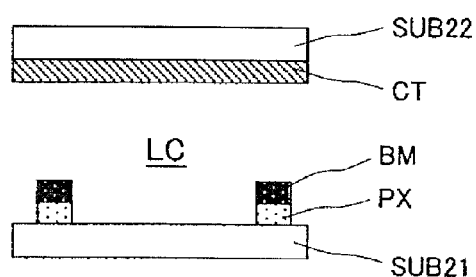

FIGS. 13A to 13D show diagrams illustrating another configuration example of the strip-shaped electrodes, the light shielding portions, and the counter electrode in the second liquid crystal display panel of the first embodiment of the invention. In the second liquid crystal display panel LCD2 of the first embodiment, as shown in FIG. 13A, the light shielding portion BM is formed on a surface of the second substrate SUB22, and the strip-shaped electrode PX is formed at an upper layer of the light shielding portion BM, but it is not limited thereto. For example, as shown in FIG. 13B, the strip-shaped electrode PX may be formed on the surface of the second substrate SUB22, and the light shielding portion BM may be at an upper layer of the strip-shaped electrode PX. In addition, as shown in FIG. 13C, the planar counter electrode CT may be formed on a surface of the second substrate SUB22, and the light shielding portion BM and the strip-shaped electrode PX may be formed on a surface of the first substrate SUB21 in this order. In addition, as shown in FIG. 13D, the planar counter electrode CT may be formed on the surface of the second substrate SUB22, and the strip-shaped electrode PX and the light shielding portion BM may be formed on the surface of the first substrate SUB21 in this order. Particularly, as shown in FIG. 13B or 13D, in a case where the light shielding portion BM is formed at the side of the liquid crystal layer LC in relation to the strip-shaped electrode PX, the strip-shaped electrode PX may be etched by using the light shielding portion BM as a resist, so that it is possible to obtain a special effect of preventing an increase in a manufacturing process accompanied with the forming of the light shielding portion BM.

Second Embodiment

Figure 14:
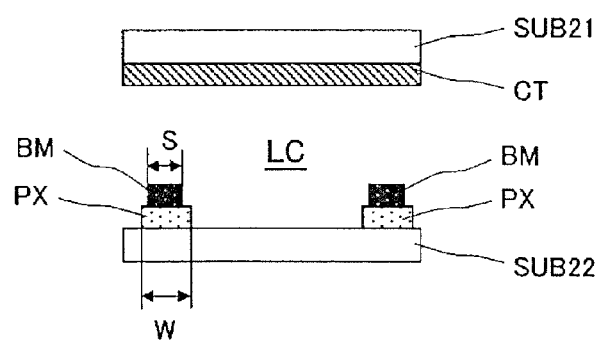
FIG. 14 is a diagram illustrating a schematic configuration of a liquid crystal display device that is a display device of a second embodiment of the invention.

FIG. 14 is a diagram illustrating a schematic configuration of a liquid crystal display device that is a display device of a second embodiment of the invention. Hereinafter, the liquid crystal display device of the second embodiment will be described based on FIG. 14. Note that the configuration of the liquid crystal display device of the second embodiment is the same as the first embodiment except for a configuration of the light shielding portion BM formed in the second liquid crystal display panel LCD2. Therefore, in the following description, the light shielding portion BM and the strip-shaped electrode PX will be described in detail. In addition, for a simple description, in FIG. 14, the second substrate SUB22 is drawn at a lower side and the first substrate SUB21 is drawn at an upper side.

As shown in FIG. 14, in the second liquid crystal display panel LCD2 of the second embodiment, in the X-direction, that is, in the parallel arrangement direction of the strip-shaped electrodes PX, the width S of the light shielding portion BM is smaller than the width W of the strip-shaped electrode PX. At this time, a peripheral edge of the light shielding portion BM in the X-direction in FIG. 14 approaches a center in relation to a peripheral edge of the strip-shaped electrode PX in the X-direction. That is, the width W of the strip-shaped electrode PX of the second embodiment is larger than the width S of the light shielding portion BM, and the peripheral edge of the strip-shaped electrode PX is located outwardly in the X-direction in relation to the peripheral edge of the light shielding portion BM. As a result, a part of a liquid crystal layer side surface of the strip-shaped electrode PX is exposed from the light shielding portion BM.

According to this configuration, in the second liquid crystal display panel LCD2 of the second embodiment, the width W of the strip-shaped electrode PX formed of a transparent electrode in the X-direction and the width S of the light shielding portion BM in the X-direction may be made to be different from each other. At this time, as is clear from a graph G4 (in the case of being formed of a transparent electrode only) and a graph G5 (in a case where the light shielding portion occupancy is 0.06) in FIG. 12, the crosstalk increases greatly in a region where the electrode occupancy r is 0.05 or less and 0.2 or more. In a case where the electrode occupancy r is small, it is considered that the formation of the distribution of the refraction index is insufficient and thereby the crosstalk occurs. On the other hand, in a case where the electrode occupancy r is large, it is considered that the crosstalk occurs above the strip-shaped electrodes PX. Therefore, in a case where the strip-shaped electrode PX is formed of a transparent electrode material of ITO, it is preferable that the electrode occupancy r be 0.05 or more, or 0.2 or less.

That is, in a case where the reduction in the moire is kept in mind, it is preferable that the width S of the light shielding portion BM be narrower than the width W of the strip-shaped electrode PX. In addition, the light shielding portion occupancy c by the light shielding portion BM is desirably smaller than the electrode occupancy r and is 0.1 or less, and particularly, 0.05 or less.

Here, in the liquid crystal display device of the second embodiment, the strip-shaped electrode PX is formed of a transparent electrode material, so that as is clear from the graph G4 and graph G5 in FIG. 12, and the graph G3 in FIG. 11, when the width S of the light shielding portion is made to be small, it is possible to reduce the occurrence of the moire, and thereby it is possible to improve a brightness at the time of the 2D display. At this time, the lower limit of the width S of the light shielding portion BM in the X-direction is restricted by the crosstalk at the time of the 3D display, and the upper limit of the width of the light shielding portion BM is restricted by the moire and the brightness at the time of the 2D display.

As described above, in the second liquid crystal display panel LCD2 of the liquid crystal display device of the second embodiment, the width W of the strip-shaped electrode PX in the X-direction is smaller than the width S of the light shielding portion BM in the X-direction, so that it is possible to improve the brightness at the time of the 2D display in addition to the effect of the first embodiment.

In addition, in the second embodiment, a case where the strip-shaped electrode PX is formed to be closer to the second substrate SUB22 in relation to the light shielding portion BM is described, but similarly to the first embodiment shown in FIGS. 13A to 13D, the light shielding portion BM may be formed to be closer to the second substrate SUB22 in relation to the strip-shaped electrode PX. In addition, the strip-shaped electrode PX and the light shielding portion BM may be formed in the first substrate SUB21 and the counter electrode CT may be formed in the second substrate SUB22.

Third Embodiment

Figure 15A:
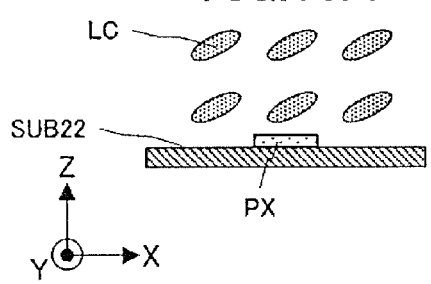
FIGS. 15A to 15F are diagrams illustrating a schematic configuration of a second liquid crystal display panel LCD2 in a display device of a third embodiment of the invention.
Figure 15D:
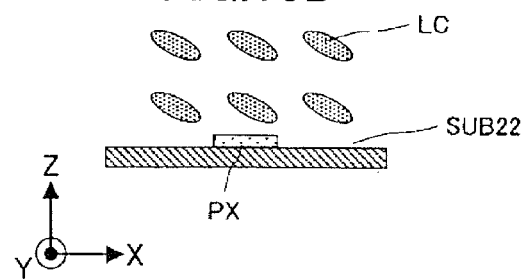
Figure 15B:
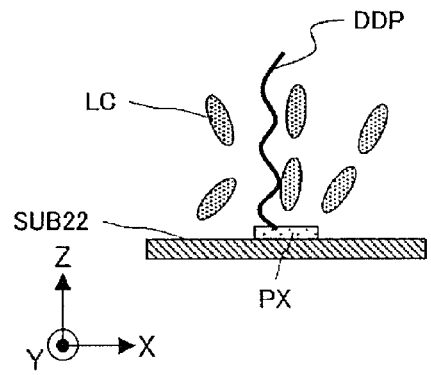
Figure 15E:
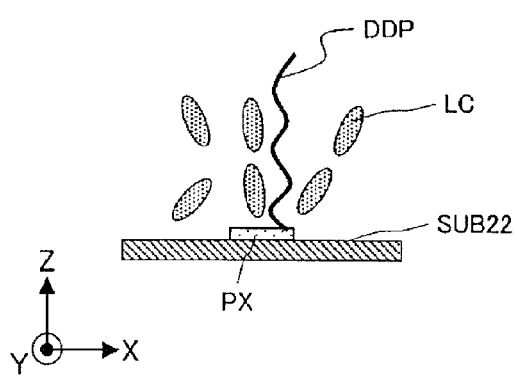
Figure 15C:
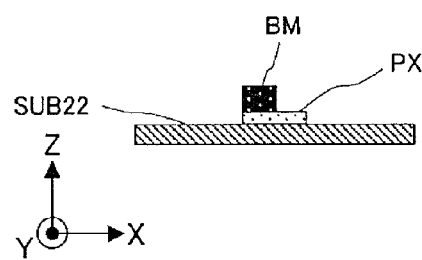
Figure 15F:
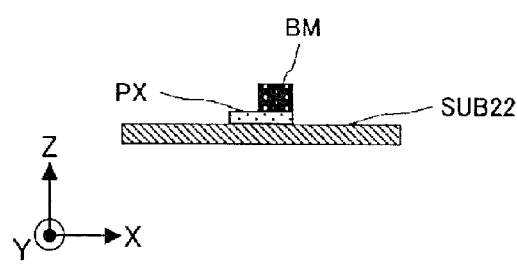

FIGS. 15A to 15F shows diagrams illustrating a schematic configuration of a second liquid crystal display panel LCD2 in a display device of a third embodiment of the invention. Particularly, FIGS. 15A and 15D show diagrams illustrating a pre-tilt angle and an initial orientation direction of the liquid crystal molecules LC with respect to the strip-shaped electrode PX and, FIGS. 15B and 15E show diagrams illustrating a relationship between a defective orientation place and the strip-shaped electrode PX at the time of applying the electric field, and FIGS. 15C and 15F show diagrams illustrating a positional relationship between the strip-shaped electrode PX and the light shielding portion BM. Note that the second liquid crystal display panel LCD2 of the third embodiment has the same configuration as the second embodiment except for a formation position of the light shielding portion BM in the X-direction, which is disposed to overlap with the strip-shaped electrode PX. Therefore, in the following description, the formation position of the light shielding portion BM will be described in detail.

FIG. 15A illustrates a case where the longitudinal direction of the liquid crystal molecules LC is initially oriented in the X-direction, and a pre-tilt angle is given such that a right side of the liquid crystal molecules LC in the longitudinal direction of the drawing is floated from the second substrate SUB22. That is, the longitudinal direction is not parallel with the second substrate SUB22, and intersects obliquely with it. In this case, when the electric field EF is applied between the strip-shaped electrode PX and the counter electrode CT (not shown), as shown in FIG. 15B, at the left side of the strip-shaped electrode PX in the drawing, that is, at one-side end (close to the second substrate SUB22 in the X-direction) that is not floated in the initial orientation between the ends of the liquid crystal molecules LC in the longitudinal direction, a defective orientation place DDP is formed. Therefore, as shown in FIG. 15C, when the light shielding portion BM is formed at a left-side end of the strip-shaped electrode PX in the X-direction of the drawing, it is possible to obtain a special effect of effectively shielding the defective orientation place, that is, a region where the distribution in the refraction index is disturbed from light without increasing the width of the light shielding portion BM in the X-direction, in addition to the above-described effect of the second embodiment. Here, as shown in FIG. 15C, the light shielding portion BM is formed on a left edge of the strip-shaped electrode PX in the X-direction of the drawing, and therefore the left edge of the strip-shaped electrode PX and the left edge of the light shielding portion BM in the drawing overlap with each other.

Similarly, FIG. 15D illustrates a case where a pre-tilt angle is given such that the left side of the liquid crystal molecules LC in the drawing, which is initially oriented in the X-direction in the longitudinal direction, is floated from the second substrate SUB22. That is, the longitudinal direction is not parallel with the second substrate SUB22, and intersects obliquely with it. In this case, when the electric field EF is applied between the strip-shaped electrode PX and the counter electrode CT, as shown in FIG. 15E, at the right side of the strip-shaped electrode PX in the drawing, that is, at one-side end (close to the second substrate SUB22 in the X-direction) that is not floated in the initial orientation between the ends of the liquid crystal molecules LC in the longitudinal direction, a defective orientation place DDP is formed. Therefore, as shown in FIG. 15F, when the light shielding portion BM is formed at a right-side end of the strip-shaped electrode PX in the X-direction of the drawing, it is possible to obtain a special effect of effectively shielding the defective orientation place, that is, a region where the distribution in the refraction index is disturbed from light without increasing the width of the light shielding portion BM in the X-direction, in addition to the above-described effect of the second embodiment. Here, as shown in FIG. 15F, the light shielding portion BM is formed on a right edge of the strip-shaped electrode PX in the X-direction of the drawing, and therefore the right edge of the strip-shaped electrode PX and the right edge of the light shielding portion BM in the drawing overlap with each other.

In addition, in an initial orientation without having the pre-tilt angle, the light shielding portion is formed in the vicinity of the center of the strip-shaped electrode PX.

Fourth Embodiment

Figure 16:
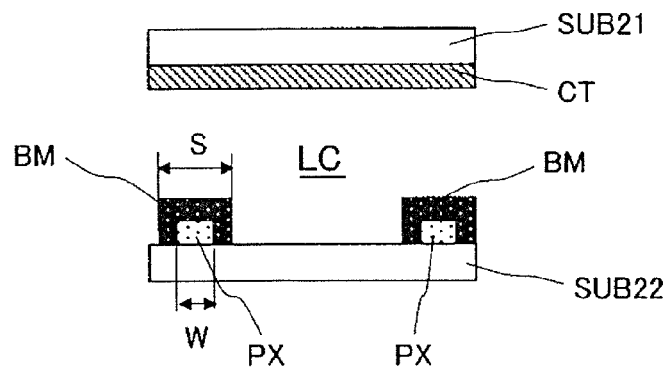
FIG. 16 is a diagram illustrating a schematic configuration of a second liquid crystal display panel in a display device of a fourth embodiment of the invention.

FIG. 16 shows a diagram illustrating a schematic configuration of a second liquid crystal display panel in a display device of a fourth embodiment of the invention. FIG. 16 illustrates a case where the width W of the strip-shaped electrode PX in the X-direction is smaller than the width S of the light shielding portion BM in the X-direction unlike the second embodiment. Therefore, in the following description, a configuration of the strip-shaped electrode PX and the light shielding portion BM will be described in detail.

As is clear from FIG. 16, the width W of the strip-shaped electrode PX of the fourth embodiment is smaller than the width S of the light shielding portion BM in the X-direction. At this time, the strip-shaped electrode PX is formed to be close to the second substrate SUB22 in relation to the light shielding portion BM and thereby the light shielding portion BM is formed at an upper layer of the strip-shaped electrode PX to overlap with it, so that in the X-direction, that is, in the parallel arrangement direction, the strip-shaped electrode PX is configured to be covered with the light shielding portion BM.

Even in the liquid crystal display device of the fourth embodiment, similarly to the above-described liquid crystal display device of the second embodiment, as is clear from the graphs G3 to G6 in FIGS. 11 and 12, in a case where the strip-shaped electrode PX is formed of a transparent electrode material of ITO, it is preferable that the electrode occupancy r be 0.05 or more or 0.2 or less. In addition, it is preferable that the light shielding portion occupancy c by the light shielding portion BM be 0.1 or less, and particularly, 0.05 or less. In addition, it is preferable that the electrode occupancy r is larger than the occupying width of the light shielding portion, and preferably, the electrode occupancy r is 0.05 or more and 0.2 or less.

At this time, in the liquid crystal display device of the fourth embodiment, it is possible to make the width S of the light shielding portion BM in the X-direction large, the crosstalk at the 3D display is largely reduced. That is, it is possible to largely increase the image quality at the time of the 3D display.

Fifth Embodiment

Figure 17:
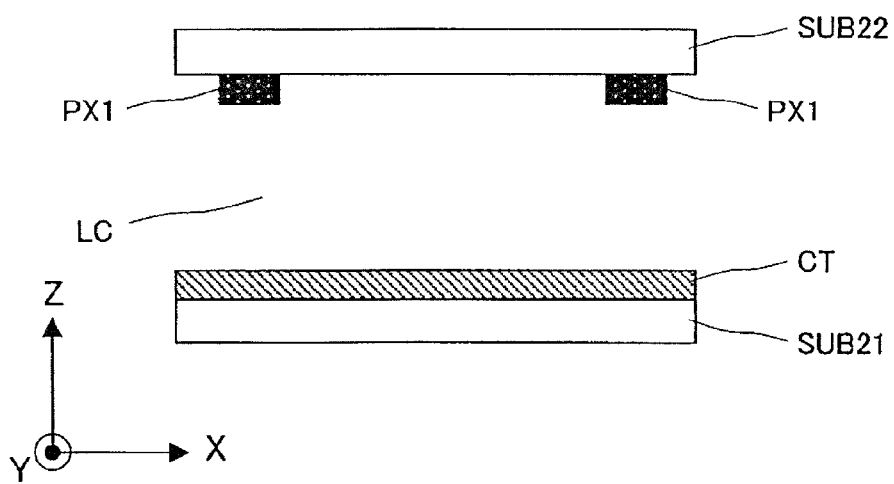
FIG. 17 is a diagram illustrating a schematic configuration of a liquid crystal display device that is a display device of a fifth embodiment of the invention.

FIG. 17 shows a diagram illustrating a schematic configuration of a liquid crystal display device that is a display device of a fifth embodiment of the invention. Note that the liquid crystal display device of the fifth embodiment has the same configuration as the second liquid crystal display panel LCD2 of the first and second embodiments except that a strip-shaped electrode PX1 of the second liquid crystal display panel LCD2 is formed of a metallic material having a light shielding property. Therefore, in the following description, the strip-shaped electrode PX1 will be described in detail.

As shown in FIG. 17, also in the second liquid crystal display panel LCD2 of the fifth embodiment, a plurality of strip-shaped electrodes PX1 extend in the Y-direction and are arranged in parallel in the X-direction. One end of each of the strip-shaped electrodes PX1 is connected to a wiring line portion WR that is formed to extend in the X-direction along one side peripheral edge at the side of a long side of the second liquid crystal display panel LCD2. The second liquid crystal display panel LCD2 of the fifth embodiment includes a pair of transparent substrates (a first transparent substrate SUB21 and a second transparent substrate SUB22) and a liquid crystal layer (liquid crystal molecules LC). The pair of transparent substrates is disposed to be opposite to each other, and the liquid crystal layer is interposed between the pair of transparent substrates. At an opposite surface side (liquid crystal side surface) of the second substrate SUB22 that is disposed at an upper side in the drawing, the strip-shaped electrode PX1 is formed. The strip-shaped electrode PX1 is formed of, for example, a metallic electrode material such as Cr (chromium), Mo (molybdenum), W (tungsten), Ta (tantalum), Nb (niobium), and an alloy thereof, which has a small reflectance.

Therefore, similarly to the first embodiment, a width of the strip-shaped electrode PX1 in the X-direction becomes a width of a light shielding region, so that it is possible to obtain the same effect as that in the liquid crystal display device of the first embodiment.

In the second liquid crystal display panel LCD2 of the display device of the fifth embodiment, among light beams emitted from the first liquid crystal display panel LCD1, a light beam that is incident to the strip-shaped electrode PX1 is blocked by the strip-shaped electrode PX1 (light shielding body), and is not emitted from the display surface side (observer side) of the second liquid crystal display panel LCD2.

In addition, the strip-shaped electrode PX1 is formed of a metallic material having a light shielding property, so that a process of forming the light shielding portion BM is not necessary, and therefore it is possible to obtain a special effect of forming the light shielding region without increasing a manufacturing process. Note that similarly to the first embodiment, a shape of a cross-section of the strip-shaped electrode PX1 is not limited to a rectangular shape, but may be another shape. For example, the shape may be a trapezoid or an arc shape in order for an electric field to be generated in an oblique direction.

In addition, at the opposite surface side (liquid crystal side surface) of the first substrate SUB21, a planar electrode (counter electrode) CT formed of a transparent conductive film such as ITO and ZnO is formed.

According to the configuration described above, similarly to the first embodiment, it is possible to largely reduce an effect caused by crosstalk accompanied with disturbance of a refraction index in a place where the strip-shaped electrode PX1 is formed, and therefore it is possible to largely improve an image quality at the time of 3D display.

In addition, in regard to the width of the strip-shaped electrode PX1 in the X-direction, similarly to the first embodiment, as is clear from the graph G3 in FIG. 11, it is preferable that the width of the light shielding portion BM, that is, a light shielding width be small so as not to generate the moire. On the other hand, to reduce the moire to a degree that the moire does not bother an observer, the moire intensity needs to be 0.3 or less, so that it is preferable the light shielding portion occupancy be 0.1 or less. In addition, to make the moire intensity 0.15 or less that is substantially the same in an ITO electrode having the electrode occupancy of 0.5, which is used in a barrier type 3D, it is preferable that the light shielding portion occupancy be 0.05 or less. In addition, as is clear from the graph G6 in FIG. 12, it is preferable that the electrode occupancy be 0.05 or more.

Sixth Embodiment

Figure 18:
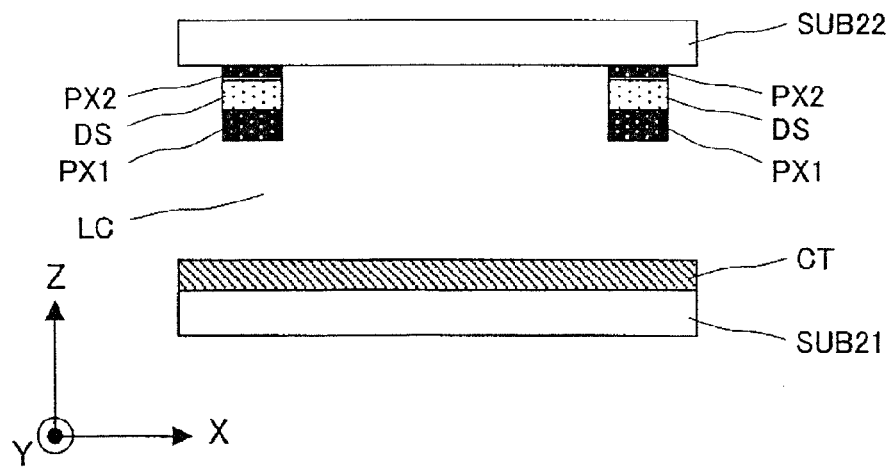
FIG. 18 is a diagram illustrating a schematic configuration of a second liquid crystal display panel in a display device of a sixth embodiment of the invention.

FIG. 18 shows a diagram illustrating a schematic configuration of a second liquid crystal display panel in a display device of a sixth embodiment of the invention, and the second liquid crystal display panel LCD2 of the sixth embodiment has the same configuration as that in the fifth embodiment except that a dielectric layer DS is provided between a first strip-shaped electrode PX1 and a second strip-shaped electrode PX2 formed of a metallic thin film to form the strip-shaped electrode. Therefore, in the following description, the strip-shaped electrode will be described in detail.

As shown in FIG. 18, in the second liquid crystal display panel LCD2 of the sixth embodiment, the strip-shaped electrode is disposed on the second substrate SUB22 that is an observer side substrate, from the second substrate SUB22 side, the second strip-shaped electrode PX2 formed of a metallic material, the dielectric layer DS formed of a dielectric material, and the first strip-shaped electrode PX1 formed of a metallic material are laminated to form one piece of strip-shaped electrode. That is, the one piece of strip-shaped electrode includes dielectric film formed of the dielectric material, and includes at least two layers or more of metallic thin film. Here, a layer thickness of the second strip-shaped electrode PX2 is smaller than a film thickness of the first strip-shaped electrode PX1. According to this configuration, in the sixth embodiment, a reflectance of the strip-shaped electrode using a metallic material is reduced, and therefore, even when the strip-shaped electrode is formed at the second substrate SUB22 that is disposed at an observer side, it is configured such that a deterioration in an image quality caused by a reflection of external light or the like on the strip-shaped electrode is prevented. At this time, in the X-direction, the first and second strip-shaped electrodes PX1 and PX2, and the dielectric layer DS are formed to have the same width as each other.

For example, the first and second strip-shaped electrodes PX1 and PX2 are formed of Cr, and the dielectric layer DS is formed of SiN (silicon nitride). In a case where the film thickness of the second strip-shaped electrode PX2 is 5 nm, the film thickness of the dielectric layer DS is 65 nm, and the film thickness of the first strip-shaped electrode PX1 is 100 nm, it is possible to reduce an electrode reflectance at the observer side to 2%. Particularly, to make the reflectance the same as that in a case where the strip-shaped electrode is formed of ITO or the like, or equal to or less than this reflectance, it is preferable that the reflectance be 3% or less. Therefore, in the sixth embodiment, the deterioration in the image quality is prevented.

In addition, in the second liquid crystal display panel LCD2 of the sixth embodiment, when the first strip-shaped electrode PX1 that is a metallic layer having the film thickness larger than that of the second strip-shaped electrode PX2 is disposed at the liquid crystal side (opposite surface side), it is possible to obtain a special effect that an electrical contact with the first strip-shaped electrode PX1 is realized easily, in addition to the effect of the liquid crystal display device of the fifth embodiment.

In addition, as the metallic material for forming the first and second strip-shaped electrodes PX1 and PX2, Cr, Mo, W, Ta, Nb, or the like, or an alloy thereof, which have a small reflectance, are preferable. In addition, as a material of the dielectric layer DS, a material having a large refraction index is preferable, and $Si_3N_4$ (silicon nitride), ZnS (zinc sulfide), $TiO_2$ (titanium oxide), $Ta_2O_5$, or the like, are suitable. In addition, ITO may be used.

Seventh Embodiment

Figure 19:
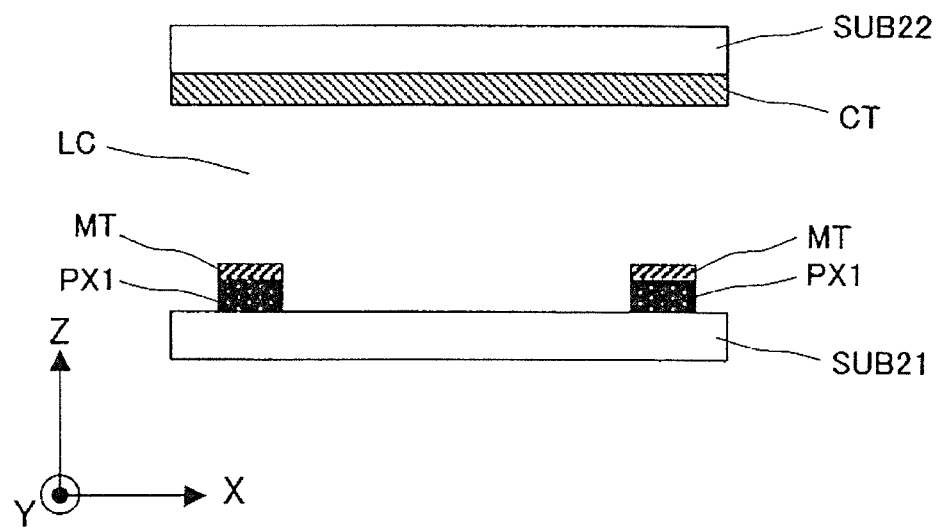
FIG. 19 is a diagram illustrating a schematic configuration of a second liquid crystal display panel in a display device of a seventh embodiment of the invention.

FIG. 19 shows a diagram illustrating a schematic configuration of a second liquid crystal display panel in a display device of a seventh embodiment of the invention. Note that in the second liquid crystal display panel LCD2 included in the display device of the seventh embodiment, the counter electrode CT is formed on the second substrate SUB22 that is an observer side transparent substrate, and the strip-shaped electrode is formed on the first substrate SUB21 that is a distant side transparent substrate. Except for this configuration and a configuration of the strip-shaped electrode, the display device of this embodiment has the same configuration as that in the fifth embodiment. Therefore, in the following description, the strip-shaped electrode will be described in detail.

As is clear from FIG. 19, in the seventh embodiment, a strip-shaped electrode PX1 and a blackened metallic layer MT are formed to overlap with each other. Here, the strip-shaped electrode PX1 is formed of a metallic material, and the blackened metallic layer MT is formed of a blackened metal. The strip-shaped electrode PX1 and the blackened metallic layer MT have the same width as each other in the X-direction. From the second substrate SUB22 side, the blackened metallic layer MT and the strip-shaped electrode PX1 are laminated to form one piece of strip-shaped electrode. That is, the one piece of strip-shaped electrode includes at least two layers or more of metallic film. Here, the blackened metallic layer MT is formed at the liquid crystal side, that is, the observer side, of the strip-shaped electrode PX1 for the prevention of reflection. Particularly, in the seventh embodiment, the strip-shaped electrode PX1 is formed of Cr and the blackened metallic layer MT is formed of CrO that is obtained by oxidizing Cr. According to this configuration, it is possible to reduce a reflectance of external light or the like at the observer side, and thereby it is possible to obtain a special effect of preventing deterioration in an image quality.

In addition, when CrO is used for the blackened metallic layer MT, it is possible to form the blackened metallic layer MT by only adding an oxidation process of Cr, and therefore it is possible to prevent a process number form being increased, in addition to the effect in the liquid crystal display device of the fifth embodiment.

In addition, the forming materials of the strip-shaped electrode PX1 and the blackened metallic layer MT are not limited to Cr and CrO, respectively. For example, the strip-shaped electrode PX1 may be formed of Al (aluminum), and the blackened metallic layer MT may be formed of Al, which is blackened by subjecting Al to a black alumite treatment, or other metallic materials.

Eighth Embodiment

Figure 20:
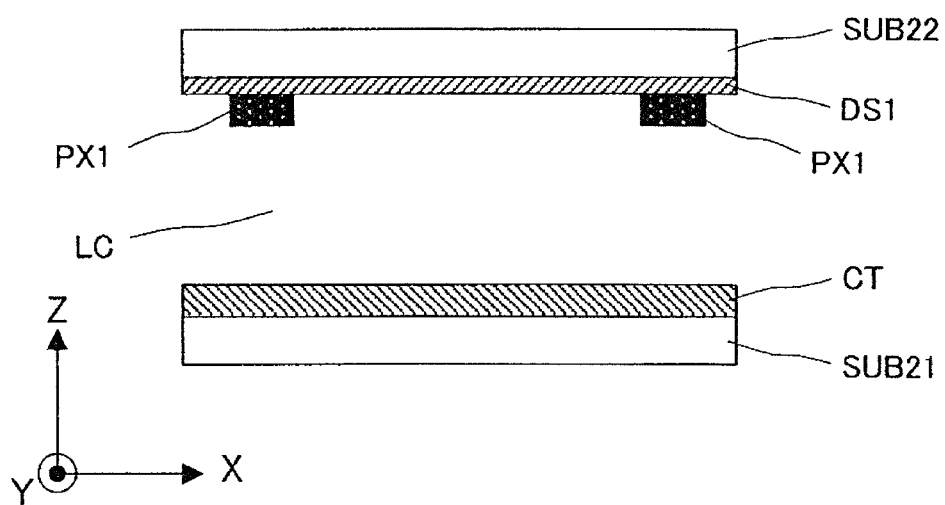
FIG. 20 is a diagram illustrating a schematic configuration of a second liquid crystal display panel in a display device of an eighth embodiment of the invention.

FIG. 20 shows a diagram illustrating a schematic configuration of a second liquid crystal display panel in a display device of a eighth embodiment of the invention. The second liquid crystal display panel has the same configuration as that of the second liquid crystal display panel LCD2 in the fifth embodiment except for a dielectric layer DS1. Therefore, in the following description, the dielectric layer DS1 and the strip-shaped electrode PX1 will be described in detail.

As is clear from FIG. 20, the dielectric layer DS1 formed of a dielectric material is formed on a liquid crystal layer LC side entire surface of the second substrate SUB22 provided to the second liquid crystal display panel LCD2 of the eighth embodiment, that is, on an opposite surface side entire surface, and the strip-shaped electrode PX1 formed of a metallic material having a light shielding property is formed on an upper layer of the dielectric layer DS1. At this time, for example, the dielectric layer DS1 is formed of SiN that is a dielectric material with a film thickness of 50 nm, and the strip-shaped electrode PX1 is formed of Cr with a film thickness of 100 nm. In the case of a comparative example in which the dielectric layer is not provided and the strip-shaped electrode PX1 that is formed of Cr, that is, a metallic material is directly formed on the second substrate SUB22, the reflectance was 52%. On the contrary, in the case of the second liquid crystal display panel LCD2 of the eighth embodiment, the dielectric layer DS1 formed of SiN is formed and the strip-shaped electrode PX1 is formed at an upper layer of the dielectric layer DS1, so that it is possible to reduce the reflectance to 34%.

Therefore, in the display device of the eighth embodiment, it is possible to obtain a special effect of reducing the reflectance in addition to the effect of the display device of the fifth embodiment. In addition, in the second liquid crystal display panel LCD2 of the eighth embodiment, it is possible to reduce the reflectance of the strip-shaped electrode PX1 formed of a metallic material by only adding a process of forming the dielectric layer DS1 on the entire surface of the second substrate SUB22, so that it is possible to obtain an effect of suppressing an increase in a manufacturing process.

In addition, as the metallic material for forming the strip-shaped electrode PX1, Cr, Mo, W, Ta, Nb, or the like, or an alloy thereof, which has a small reflectance, are preferable. In addition, as a material of the dielectric layer DS1, a material having a large refraction index is preferable, and $Si_3N_4$ (silicon nitride), ZnS (zinc sulfide), $TiO_2$ (titanium oxide), $Ta_2O_5$, or the like are suitable.

Ninth Embodiment

Figure 21:
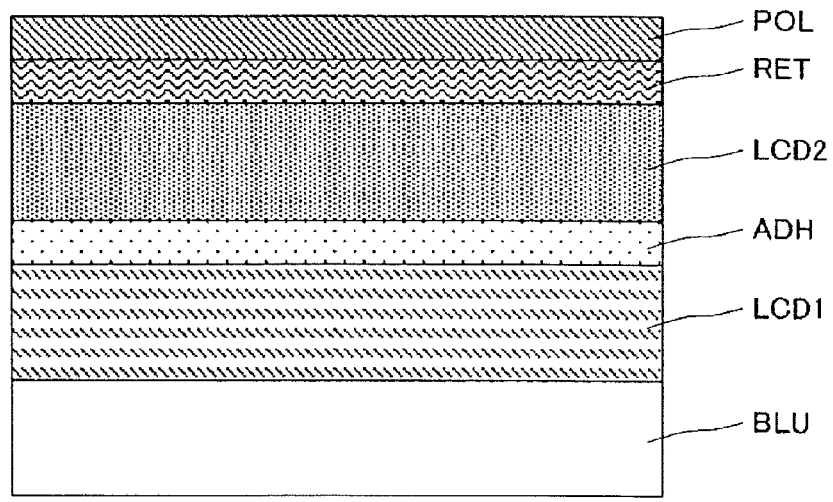
FIG. 21 is a diagram illustrating a schematic configuration of a liquid crystal display device that is a display device of a ninth embodiment of the invention.

FIG. 21 shows a diagram illustrating a schematic configuration of a liquid crystal display device that is a display device of a ninth embodiment of the invention. This configuration is the same as that of the fifth embodiment except for a polarization plate POL and a phase difference plate (λ/4 plate) RET that are disposed at an observer side. Therefore, in the following description, the polarization plate POL and the phase difference plate (λ/4 plate) RET will be described in detail.

As is clear from FIG. 21, in the ninth embodiment, the polarization plate POL is disposed at an observer side of the λ/4 plate RET, and thereby a circular polarization plate including a combination of the λ/4 plate RET and the polarization plate POL is formed. That is, unlike the configuration of the fifth embodiment, the λ/4 plate RET is disposed between the second liquid crystal display panel LCD2 and the polarization plate POL. According to this configuration, it is possible to make a metallic reflection caused by the strip-shaped electrode PX1 formed of a metallic material disappear, so that it is possible to obtain a special effect of preventing deterioration in an image quality caused by a reflectance of external light or the like on the strip-shaped electrode PX1, in addition to the effect of the display device of the fifth embodiment.

Tenth Embodiment

Figure 22A:
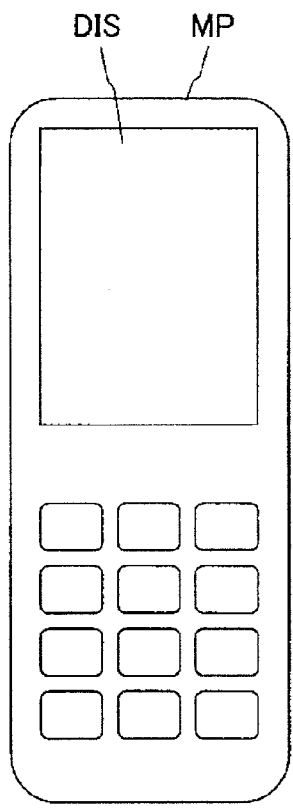
FIGS. 22A and 22B are diagrams illustrating a schematic configuration of an information apparatus of a tenth embodiment, which includes the display device of the invention.
Figure 22B:
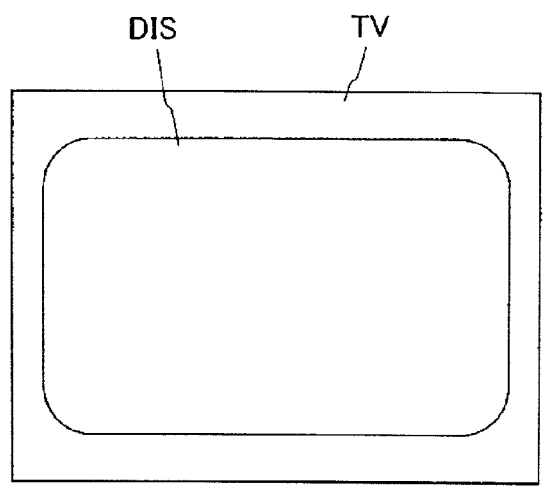

FIGS. 22A and 22B show diagrams illustrating a schematic configuration of an information apparatus of a tenth embodiment, which includes the display device of the invention. FIG. 22A illustrates a case where a display device LCD of the invention is applied to a mobile information terminal MP, and FIG. 22B illustrates a case where a display device DIS of the invention is applied to a television device TV.

As shown in FIG. 22A, when the display device DIS of the invention is applied to the mobile information terminal MP such as a mobile gaming machine and a mobile phone, it is possible to reduce the moire at the time of the 2D display, and the crosstalk at the time of the 3D display. As a result, it is possible to improve an image quality at the time of the 2D display and the 3D display. Similarly to this, even when the display device DIS of the invention is applied to the television device TV, it is possible to reduce the moire at the time of the 2D display, and the crosstalk at the time of the 3D display. As a result, it is possible to improve an image quality at the time of the 2D display and the 3D display.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device displaying an image by switching a two-dimensional display and a three-dimensional display, the display device comprising:
 a display panel performing an image display; and
 a liquid crystal display panel being disposed at a display surface side of the display panel; the liquid crystal display panel comprising:
  a first transparent substrate comprising a planar transparent electrode;
  a second transparent substrate being opposite to the first substrate; the second transparent substrate comprising:
   a plurality of strip-shaped electrodes being formed of a transparent electrode material, extending in a first direction, and being arranged in parallel in a second direction intersecting with the first direction; and
   a plurality of strip-shaped light shielding portions overlapping with the plurality of strip-shaped electrodes and extending in the first direction; and
  a liquid crystal layer being interposed between the first substrate and the second substrate;
 wherein a longitudinal direction in an initial orientation of liquid crystal molecules making up the liquid crystal layer intersects with the first direction and intersects obliquely with the second substrate;
 wherein a width of the strip-shaped electrodes in the second direction is larger than a width of the strip-shaped light shielding portions;
 wherein the light shielding portions are formed at a peripheral edge of the strip-shaped electrodes at the side where an end of liquid crystal molecules in the longitudinal direction is closer to the second substrate in the second direction; and
 wherein cylindrical lenses extending in the first direction, being arranged in parallel in the second direction, and making up a parallax barrier, are formed by controlling a refraction index of the liquid crystal layer.

2. The display device according to claim 1, wherein the display panel includes a liquid crystal display panel and a backlight device.

* * * * *